(12) United States Patent
Sato

(10) Patent No.: US 10,866,717 B2
(45) Date of Patent: Dec. 15, 2020

(54) NUMERICAL CONTROLLER

(71) Applicant: Fanuc Corporation, Yamanashi (JP)

(72) Inventor: Shuji Sato, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/550,907

(22) Filed: Aug. 26, 2019

(65) Prior Publication Data

US 2020/0073542 A1    Mar. 5, 2020

(30) Foreign Application Priority Data

Aug. 29, 2018  (JP) ................................ 2018-160710

(51) Int. Cl.
  *G06F 3/048*  (2013.01)
  *G06F 3/0484*  (2013.01)
  *G06F 3/0482*  (2013.01)

(52) U.S. Cl.
  CPC ........ *G06F 3/04847* (2013.01); *G06F 3/0482* (2013.01)

(58) Field of Classification Search
  None
  See application file for complete search history.

(56) References Cited

U.S. PATENT DOCUMENTS

| 6,667,751 | B1* | 12/2003 | Wynn | G06F 16/955 715/833 |
| 2016/0327931 | A1* | 11/2016 | Gu | G05B 19/402 |
| 2017/0060356 | A1* | 3/2017 | Oota | G06N 20/00 |
| 2019/0121320 | A1* | 4/2019 | May | G05B 19/4083 |
| 2019/0202017 | A1* | 7/2019 | Sagasaki | B23B 7/02 |

FOREIGN PATENT DOCUMENTS

| JP | 2002-278666 A | 9/2002 |
| JP | 6257849 B | 12/2016 |

* cited by examiner

*Primary Examiner* — Thanh T Vu
(74) *Attorney, Agent, or Firm* — RatnerPrestia

(57) ABSTRACT

A numerical controller capable of easily creating a custom screen on which necessary information is aggregated includes an attribute assignment unit for assigning an attribute to one or more screen components included in one or more existing screens, a custom screen creation unit for setting the attribute to be displayed on the custom screen, and a custom screen display unit for displaying the custom screen on which the screen components selected based on the attribute are exclusively aggregated.

3 Claims, 9 Drawing Sheets

SCREEN EMPTY AREA MAP

NUMERICAL CONTROLLER

RELATED APPLICATION

The present application claims priority to Japanese Application Number 2018-160710 filed Aug. 29, 2018, the disclosure of which is hereby incorporated by reference herein in its entirety.

BACKGROUND OF THE INVENTION

1. Field of the Invention

The present application relates to a numerical controller, and particularly relates to a numerical controller capable of easily creating a custom screen on which necessary information is aggregated.

2. Description of the Related Art

A conventional numerical controller has a screen in which display contents and arrangement thereof are defined for each operation purpose and fixed. The display contents and arrangement of the screen cannot be dynamically changed during display. Examples of such a screen include a state monitoring screen during operation, a program editing screen, a condition setting screen, and an alarm display screen.

When a user desires to add a user-specific screen, the screen is created each time by arranging general-purpose graphics (lines, arcs, rectangles, characters, etc.) or screen components (labels, buttons, lists, graphs, etc.) on the screen and programming an operation. This task normally requires a great deal of time and effort.

Meanwhile, schemes shown in JP 6257849 B2 and JP 2002-278666 A have been proposed as a program-less screen customization method. JP 6257849 B2 discloses a function of adding or deleting a predetermined display item on an existing screen. JP 2002-278666 A discloses a function of arranging display components (buttons, lists, graphs, etc.) selected from an existing screen on a custom screen.

In a conventional numerical controller, a screen is usually configured to meet the purpose of each operation. For this reason, information desired to be confirmed by an operator may not be aggregated on one screen in many cases. In this case, the operator needs to switch a plurality of screens to confirm the information. For example, in a numerical controller including a plurality of systems, only information related to system 1 may be desired to be confirmed. In this case, in the past, the operator had to laterally confirm the information related to system 1 dispersed to a plurality of screens. A function for easily creating a screen in which the information related to system 1 is aggregated has not been provided.

In addition, in a conventional display screen configured for receiving user operation, information other than information desired to be confirmed by the operator, in other words, unnecessary information has been frequently displayed. For this reason, it is difficult for the operator to confirm target information. In other words, it takes time and effort to narrow down the information. In addition, there is a risk that the operator may erroneously recognize the target information as other information. For example, there is a possibility that data of a system different from a system desired to be confirmed may be erroneously referred to. Furthermore, to acquire unnecessary information, resources such as a CPU, a bus, an external communication, etc. are unnecessarily loaded.

In addition, the scheme described in JP 6257849 B2 merely edits an existing screen, and cannot cope with a need for collecting necessary information from an arbitrary screen to create a new screen. The scheme described in JP 2002-278666 A can create a new screen including components collected from a plurality of screens. However, it is necessary to manually create a screen and collect screen components, and a great deal of time and effort is still necessary.

SUMMARY OF THE INVENTION

The application is intended to solve such a problem, and an object of the application is to provide a numerical controller capable of easily creating a custom screen on which necessary information is aggregated.

A numerical controller according to an embodiment of the application is characterized by including an attribute assignment unit for assigning an attribute to one or more screen components included in one or more existing screens, a custom screen creation unit for setting the attribute to be displayed on a custom screen, and a custom screen display unit for displaying the custom screen on which the screen components selected based on the attribute are exclusively aggregated.

A numerical controller according to an embodiment of the application is characterized in that the custom screen creation unit sets a plurality of attributes to be displayed on the custom screen and a logical relationship between the plurality of attributes.

A numerical controller according to an embodiment of the application is characterized in that the attribute specific to a user is allowed to be newly registered.

According to the application, it is possible to provide a numerical controller capable of easily creating a custom screen on which necessary information is aggregated.

BRIEF DESCRIPTION OF THE DRAWINGS

The above-described object and characteristic of the application and other objects and characteristics will be clear from description of embodiments below with reference to accompanying drawings. In the drawings.

DETAILED DESCRIPTION OF THE
PREFERRED EMBODIMENTS

Embodiment 1

Figure 1:
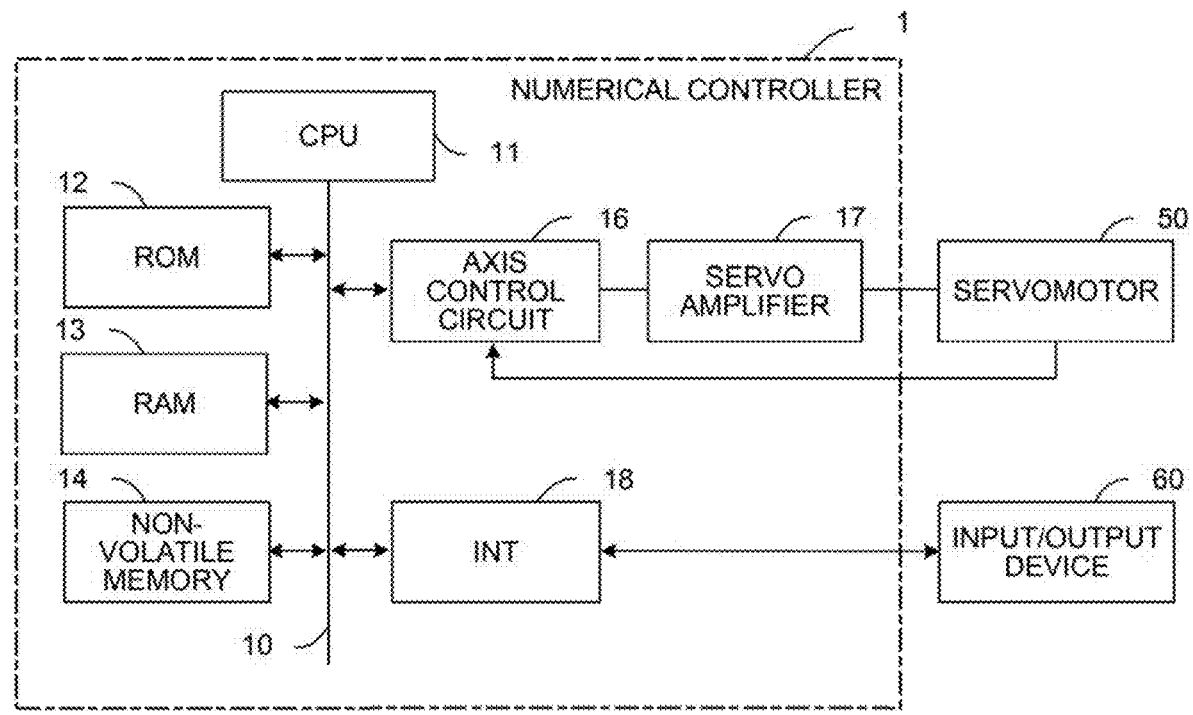
FIG. 1 is a diagram illustrating a hardware configuration example of a numerical controller.

FIG. 1 is a hardware configuration diagram schematically illustrating a main part of a numerical controller 1 according to Embodiment 1. The numerical controller 1 is a device that controls an industrial machine including a machine tool. The numerical controller 1 includes a CPU 11, a ROM 12, a RAM 13, a non-volatile memory 14, a bus 10, an axis control circuit 16, a servo amplifier 17, and an interface 18. A servomotor 50 and an input/output device 60 are connected to the numerical controller 1.

The CPU 11 is a processor that controls the numerical controller 1 as a whole. The CPU 11 reads a system program stored in the ROM 12 via the bus 10, and controls the entire numerical controller 1 according to the system program.

The ROM 12 stores in advance a system program for executing various controls of the industrial machine.

The RAM 13 temporarily stores temporary calculation data or display data, data or a program input by the operator via the input/output device 60, etc.

The non-volatile memory 14 is backed up by, for example, a battery (not illustrated), and is kept in a storage state even when power of the numerical controller 1 is turned off. The non-volatile memory 14 stores data, a program, etc. input from the input/output device 60. The program or the data stored in the non-volatile memory 14 may be loaded in the RAM 13 during execution or during use.

The axis control circuit 16 controls a motion axis of the industrial machine. The axis control circuit 16 receives an axis movement command amount output from the CPU 11, and outputs a motion axis movement command to the servo amplifier 17.

The servo amplifier 17 receives the axis movement command output from the axis control circuit 16 and drives the servomotor 50.

The servomotor 50 is driven by the servo amplifier 17 to move the motion axis of the industrial machine. The servomotor 50 typically incorporates a position/speed detector. The position/speed detector outputs a position/speed feedback signal, which is fed back to the axis control circuit 16 to perform position/speed feedback control.

Incidentally, FIG. 1 illustrates only one axis control circuit 16, one servo amplifier 17, and one servomotor 50. However, in practice, each of the number of axis control circuits 16, the number of servo amplifiers 17, and the number of servomotor 50 to be prepared corresponds to the number of axes to be controlled included in the industrial machine.

The input/output device 60 is a data input/output device including a display, a hardware key, etc. and typically corresponds to an MDI or a console panel. The input/output device 60 displays information received from the CPU 11 via the interface 18 on the display. The input/output device 60 delivers a command, data, etc. input from the hardware key, etc. to the CPU 11 via the interface 18.

Figure 2:
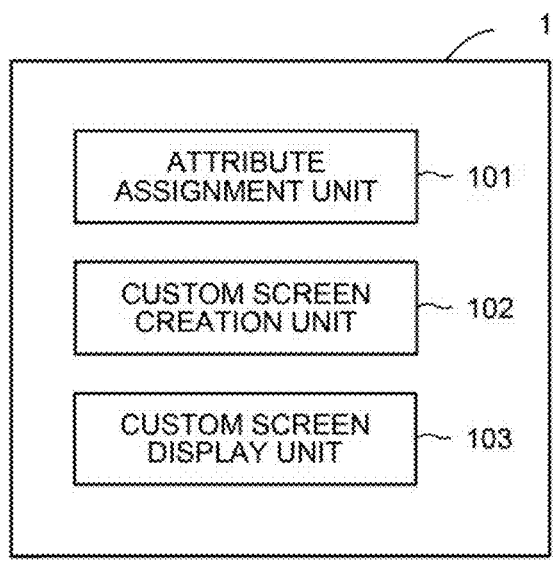
FIG. 2 is a diagram illustrating a functional configuration example of the numerical controller.

FIG. 2 is a block diagram illustrating a schematic functional configuration of the numerical controller 1. In addition to various functions of a conventional numerical controller, the typical numerical controller 1 includes an attribute assignment unit 101, a custom screen creation unit 102, and a custom screen display unit 103 for performing characteristic processing of the numerical controller 1. A description will be given of an operation example of each processing unit using screen images of FIG. 3 to FIG. 5 and flowcharts of FIG. 6 to FIG. 8.

The attribute assignment unit 101 assigns attribute information to a screen component included in an existing screen (a screen displayed by a standard function of the numerical controller 1).

The screen component is a component included in an existing screen, and includes, for example, a display area for displaying each piece of information such as a processing program, a processing status (a used tool, a coordinate value, etc.), various messages (error messages, operation history, etc.), etc. in each system.

The attribute information is an arbitrary label that can be assigned to each screen component, and may correspond to, for example, a category of information (coordinates, a program, a tool, setting, a signal, a message, etc.), a system number, an axis number, a shape of the screen component (a label, a numerical value display, a button, a list, a meter, a key input, etc.), other keywords, etc. The attribute assignment unit 101 can assign arbitrary attribute information to the screen component. Note that predetermined attribute information may be assigned to the screen component in advance. It is presumed that the attribute assignment unit 101 can assign a plurality of pieces of attribute information to the screen component.

Figure 10:
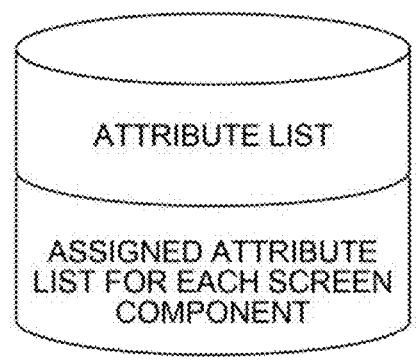
FIG. 10 is a diagram illustrating an example of a storage area for holding attribute information.

FIG. 10 is a diagram illustrating an example of the storage area for holding the attribute information. The storage area accessible by the attribute assignment unit, the custom screen creation unit, and the custom screen display unit includes an attribute list and an attribute list for each screen component. The attribute list is a list of attributes that can be assigned to the screen component. The attribute list for each screen component is a list of attributes assigned to the screen component and has, for example, a data structure in which one or more attributes are linked to an identifier uniquely representing the screen component.

Figure 3:
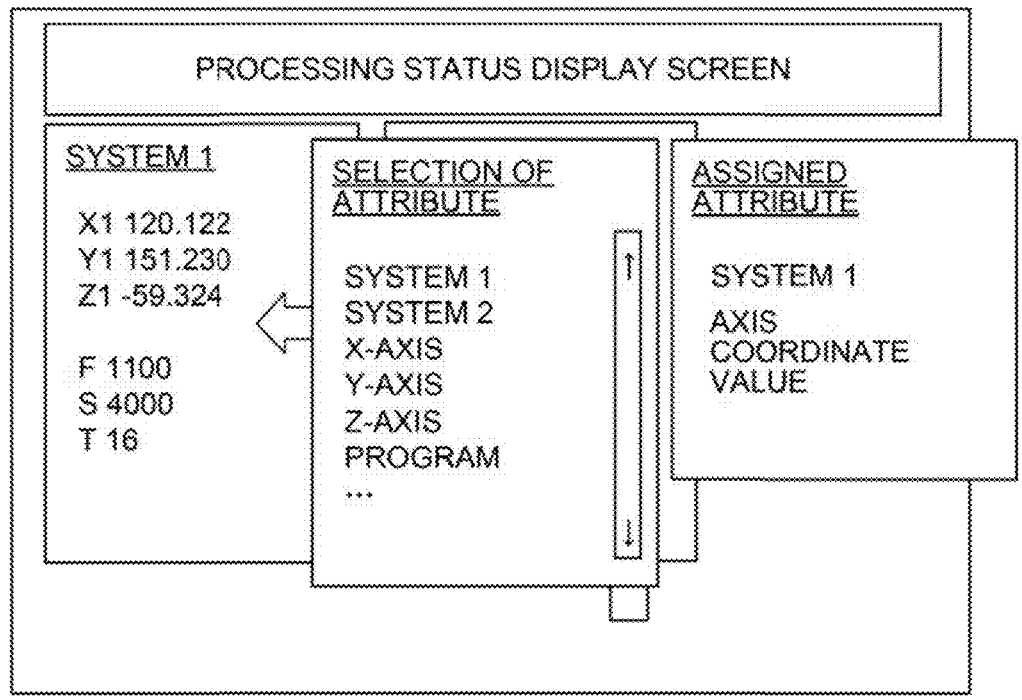
FIG. 3 is a diagram illustrating an operation of an attribute assignment unit.

A description will be given of an example of an operation when the attribute assignment unit 101 assigns attribute information to the screen component with reference to FIG. 3. Upon detecting a predetermined operation (for example, a right-click operation, a tap operation, etc.) performed on a screen component (a processing program display area of "system 1" in FIG. 3) of an existing screen (a "processing status display screen" in FIG. 3), the attribute assignment unit 101 displays an attribute list (a pop-up menu named "selection of attribute" in FIG. 3) for selecting an assigned attribute. The attribute list shows a list of attributes that can be assigned to the screen component. When a user selects a desired attribute from the attribute list, the attribute assignment unit 101 assigns the selected attribute to the screen component. It is preferable to feed back the attribute assigned to the screen component to notify the user what attribute have been selected. In FIG. 3, one or more attributes currently assigned to the screen component are listed and displayed in a pop-up window ("assigned attribute").

Figure 6:
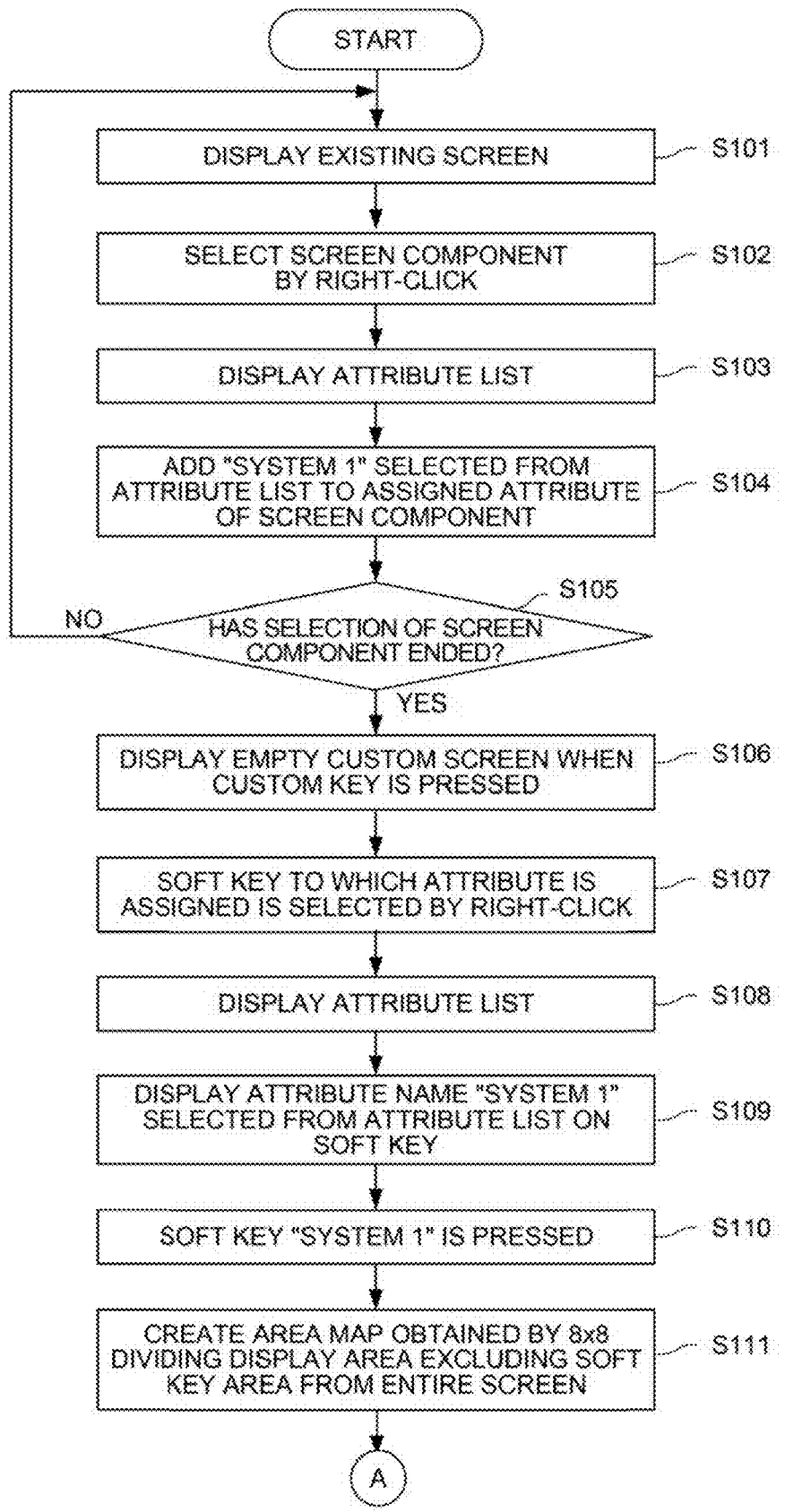
FIG. 6 is a flowchart illustrating an operation of the numerical controller.

A description will be given of an example of an operation when the attribute assignment unit 101 assigns an attribute to a screen component included in an existing screen with reference to a flowchart of FIG. 6. In this example, an attribute "system 1" is assigned to a screen component that displays information related to system 1.

S101: The existing screen is displayed by a standard function of the numerical controller 1.

S102: The attribute assignment unit 101 detects a selection operation (typically, a right-click operation, etc.) performed on the screen component of the existing screen.

S103: The attribute assignment unit 101 displays an attribute list (a pop-up menu listing assignable attributes) for selecting an assigned attribute.

S104: Upon detecting an operation of selecting an attribute from the attribute list, the attribute assignment unit 101 assigns the selected attribute to the screen component.

The custom screen creation unit 102 aggregates screen components to which attribute information is assigned to create a new screen, that is, a custom screen.

Figure 4:
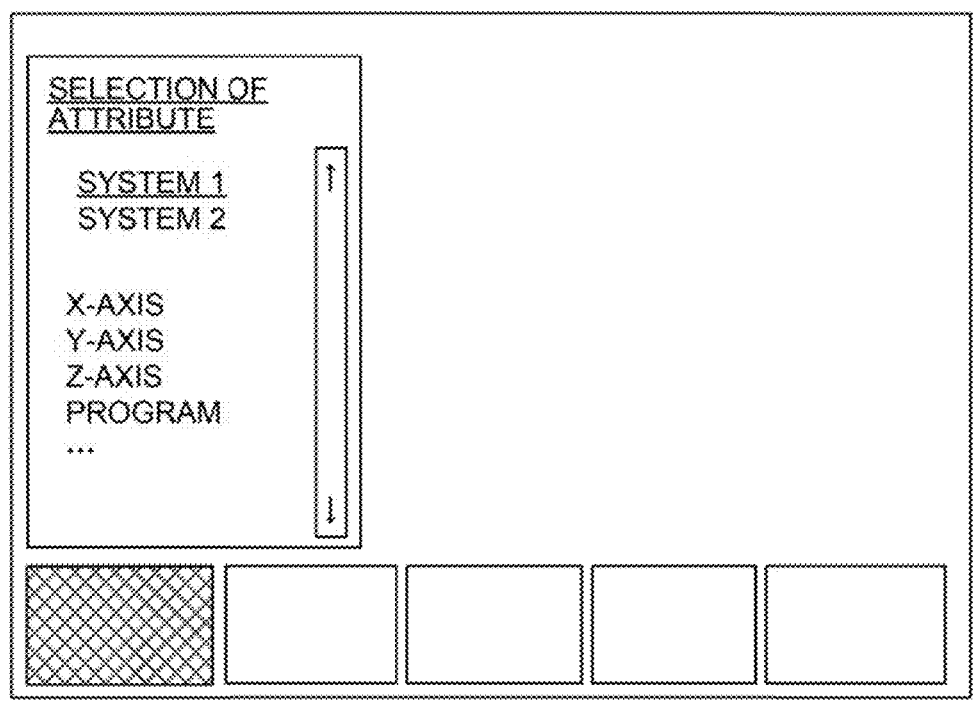
FIG. 4 is a diagram illustrating an operation of a custom screen creation unit.
Figure 5:
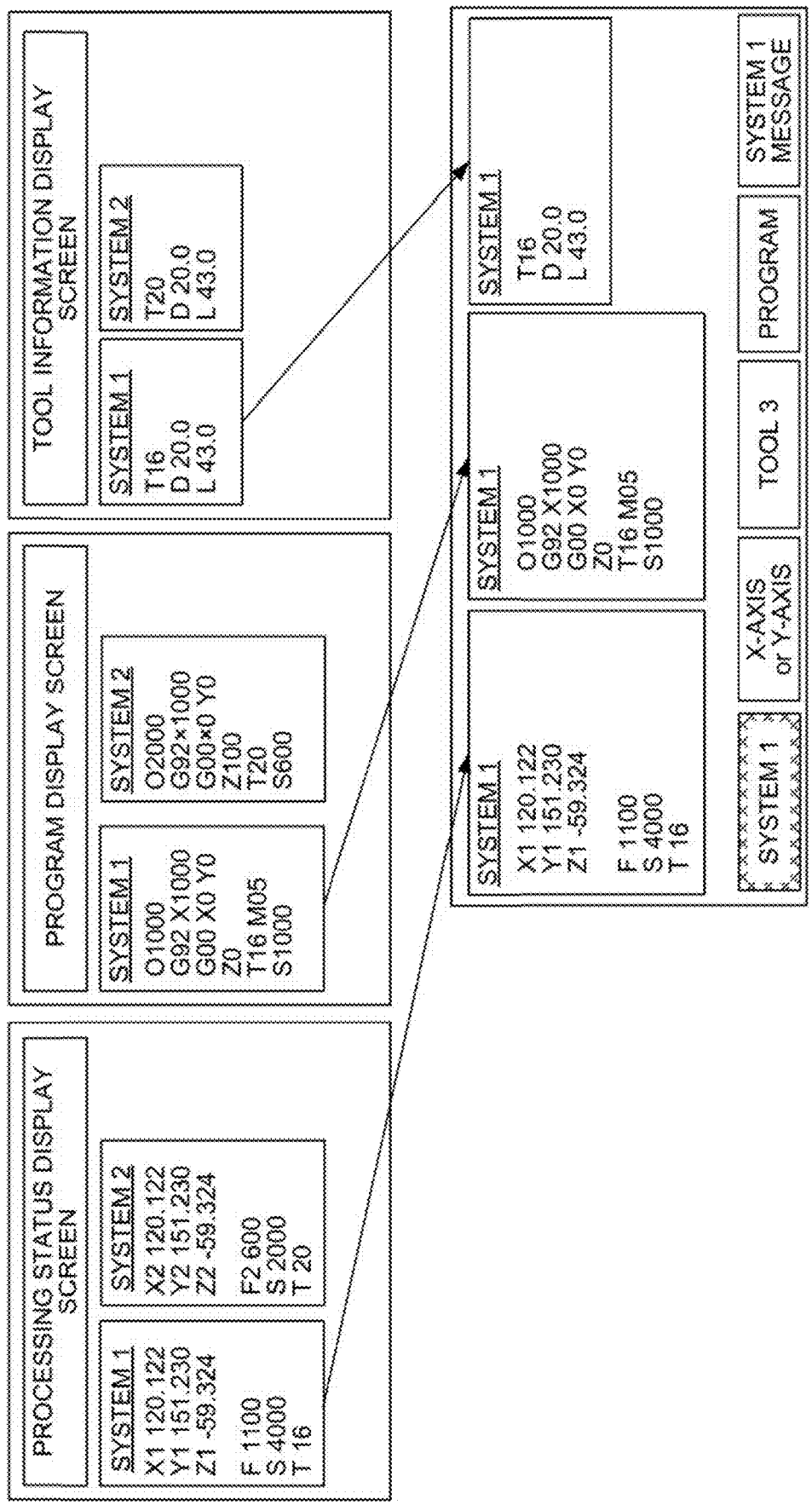
FIG. 5 is a diagram illustrating operations of the custom screen creation unit and a custom screen display unit.

A description will be given of an example of an operation when the custom screen creation unit 102 creates the custom screen with reference to FIG. 4 and FIG. 5. When a custom screen creation command is executed, the custom screen creation unit 102 displays a blank custom screen and a plurality of blank soft keys on the screen. Upon detecting a predetermined operation (for example, a right-click operation, a tap operation, etc.) performed on the blank soft key (the selected soft key is indicated by hatching in FIG. 4), the custom screen creation unit 102 displays an attribute list (a pop-up menu named "selection of attribute" in FIG. 4) for assigning an attribute. This attribute list includes one or more attributes assigned to the screen component. When the user selects a desired attribute from the attribute list, the custom screen creation unit 102 collects screen components to which the selected attribute is assigned, and displays the collected screen components on the blank custom screen. That is, screen components having the same attribute and originally existing in various existing screens in a dispersed manner are laterally collected and displayed on one custom screen in an aggregated manner by the custom screen creation unit 102 (FIG. 5). In addition, a name of the assigned attribute is displayed on the soft key. In this way, for example, it is possible to laterally collect information related to a specific attribute exclusively, such as a specific system number, a specific axis number, a specific program, a specific tool number, and a specific signal, from a plurality of existing screens configured to receive user operations, and display the collected information in an aggregated manner.

The custom screen creation unit 102 also create a custom screen by collecting screen components according to conditions defining the combination of attributes. Upon detecting a predetermined operation (for example, a right-click operation, a tap operation, etc.) performed on a soft key to which an attribute is previously assigned (attribute name is displayed), the custom screen creation unit 102 displays an attribute list for assigning an attribute to be added and an interface for selecting a scheme of combining the attribute to be added and the attribute previously assigned to the soft key. Examples of the attribute combination scheme include AND (logical product), OR (logical sum), and NOT (not). When a plurality of attributes is assigned in this manner, a logical expression representing a combination of attributes, for example, combination of a plurality of selected attribute names, is displayed on the soft key. In this way, for example, it is possible to obtain a logical product (AND) of a plurality of attributes, such as a system number and an axis number, and extract and display information related to a specific system and a specific axis exclusively.

Figure 9:
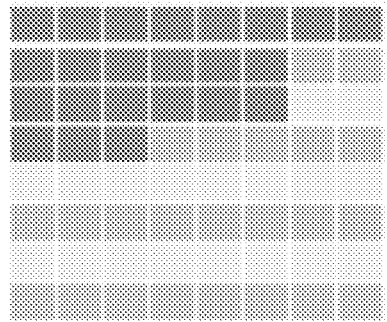
FIG. 9 is a diagram illustrating an operation of the custom screen creation unit.

A description will be given of an example of an operation when the custom screen creation unit 102 arranges a screen component on a blank custom screen with reference to FIG. 9. The custom screen has an area map in which a display area is divided into small matrix areas. A width and a height of each of the small areas are determined in advance. The custom screen creation unit 102 selects, from the area map, a combination of free (unused) small areas (light-colored small areas in FIG. 9) ensuring an area larger in size than a screen component to be newly arranged, and arranges the screen component. The small areas in which the screen component is already arranged are marked as used areas (dark-colored small areas in FIG. 9). As a result, screen components are arranged on the custom screen without overlap.

Figure 7:
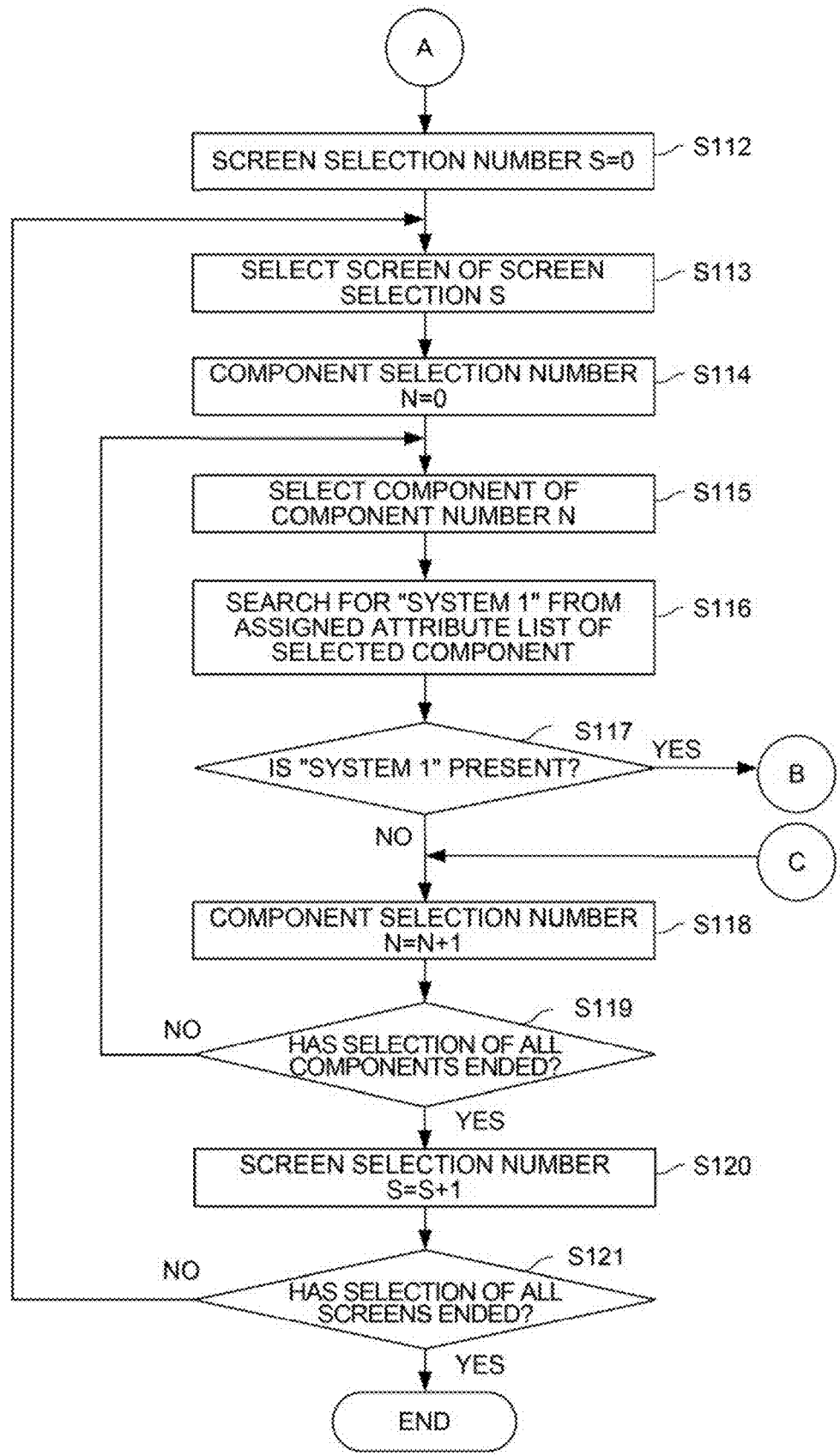
FIG. 7 is a flowchart illustrating an operation of the numerical controller.
Figure 8:
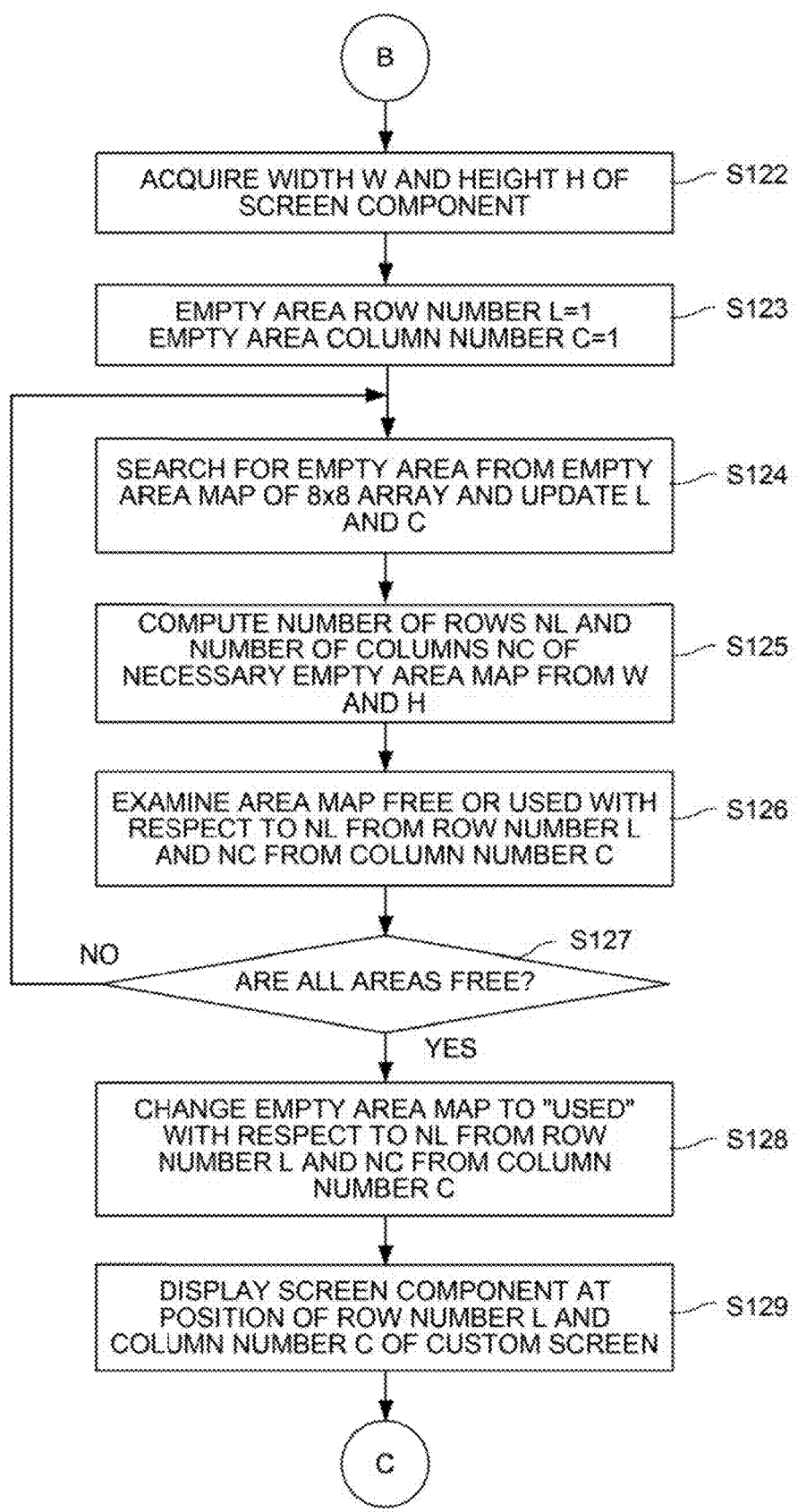
FIG. 8 is a flowchart illustrating an operation of the numerical controller.

A description will be given of an example of an operation when the custom screen creation unit 102 creates a custom screen by aggregating screen components to which attribute information is assigned with reference to flowcharts of FIG. 6 to FIG. 8. In this example, screen components to which attribute "system 1" assigned are aggregated and a custom screen displaying the aggregated screen components is created.

S106: Upon detecting that a predetermined key (a CUSTOM key in this example) has been pressed, the custom screen creation unit 102 starts a custom screen creation mode, and displays an empty custom screen and an empty soft key on the screen.

S107: The custom screen creation unit 102 detects a predetermined operation (right-click operation in this example) performed on the blank soft key.

S108: The custom screen creation unit 102 pop-up displays the attribute list.

S109: Upon detecting that the attribute "system 1" is selected from the attribute list, the custom screen creation unit 102 sets the selected attribute name "system 1" as a name of the soft key on which the right-click operation has been performed. In this way, a character string "system 1" is displayed on the soft key.

S110: The custom screen creation unit 102 detects that the soft key "system 1" is pressed. Incidentally, after execution of step S109, this step may be skipped to immediately perform step S111.

S111: The custom screen creation unit 102 internally creates an area map obtained by dividing a display area (an area for displaying screen components excluding an area related to the soft key from the entire custom screen) in a matrix shape (8×8 in this example).

S112: The custom screen creation unit 102 repeatedly executes processing of steps S113 to S121 for each existing screen.

S113: The custom screen creation unit 102 selects an unprocessed existing screen.

S114: The custom screen creation unit 102 repeatedly executes processing of steps S115 to S119 for each screen component included in the existing screen selected in step S113.

S115: The custom screen creation unit 102 selects an unprocessed screen component.

S116: The custom screen creation unit 102 searches for the attribute "system 1" selected in step S109 from among one or more attributes assigned to the screen component selected in step S115.

S117: When the attribute "system 1" is found, the custom screen creation unit 102 executes a screen component arrangement process (step S122 and subsequent steps) described below.

S118 to S119: When the attribute "system 1" is not found, the custom screen creation unit 102 determines whether another unprocessed component remains. When another unprocessed component is present, the process proceeds to step S115. When another unprocessed component is not found, the process proceeds to step S120.

S120 to S121: The custom screen creation unit 102 determines whether another unprocessed existing screen remains. When another unprocessed existing screen remains, the process proceeds to step S113. When another unprocessed existing screen does not remain, the process is ended.

S122 and subsequent steps correspond to a flowchart relating to the screen component arrangement process.

S122: The custom screen creation unit 102 acquires a width W and a height H of the screen component found in S117, to which the attribute "system 1" is assigned.

S123: The custom screen creation unit 102 initializes each of an empty area row number L and an empty area column number C, which are variables for searching for a free small area.

S124: The custom screen creation unit 102 searches for a free small area using a scheme for consecutively examining the small areas included in the matrix of the area map from an end. For example, comprehensive examination of the small areas can be performed by changing L in an ascending order from 1 to 8 and successively changing C in an ascending order from 1 to 8.

S125: The custom screen creation unit 102 computes a minimum required free small area for displaying the screen component having the width W and the height H. For example, the required rectangular area comprised of small areas (horizontal number NL=W/w, vertical number NC=H/h) (all rounded up to the decimal point) can be obtained by calculation, based on the width w and height h of the small free area.

S126: When a free small area is found in step S124, the custom screen creation unit 102 examines all the small areas comprising the rectangular area, from the free small area to the horizontal number of NL and the vertical number of NC in a positive direction, to determine whether all the small areas in the rectangular area are free small area.

S127 to S129: When all the small areas, the horizontal number of NL and the vertical number of NC, included in the rectangular area, are determined as free small area in step S126, the custom screen creation unit 102 changes all the small areas of the rectangular area to used areas, and arranges the screen component in the rectangular area.

Incidentally, when sufficient free small areas for displaying the screen component cannot be found, the custom screen creation unit 102 adds a new blank page to the custom screen, and performs processing from S124 on the blank page, thereby adding the screen components to the blank page. In this case, the custom screen creation unit 102 may provide an interface (typically, "previous page" and "next page" buttons, scroll, etc.) that enables transition between pages to each page of the custom screen.

The custom screen display unit 103 provides a function for easily displaying the created custom screen. When the soft key to which the attribute is previously assigned is pressed, the custom screen display unit 103 collects screen components to which the selected attribute is assigned, and displays the collected screen components on the blank custom screen. That is, screen components having the same attribute, which are originally present in various existing screens in a dispersed manner, are laterally collected and displayed on one custom screen in an aggregated manner. FIG. 5 illustrates an example in which when the hatched soft key "system 1" is pressed, screen components to which the attribute "system 1" is assigned are laterally collected and displayed on one custom screen in an aggregated manner. The details of the processing are the same as that of the custom screen creation unit 102 shown from step S110 of FIG. 6 to FIG. 9, and thus a description thereof will be omitted.

According to the present embodiment, the numerical controller 1 instantaneously collects information, to which the attribute selected by the user is assigned, without requiring complicated operation for creating the custom screen in advance, and can simply and immediately create the custom screen.

In addition, according to the present embodiment, the numerical controller 1 aggregates and displays an information group desired to be confirmed by the user on one screen, which has been present across conventional existing screens configured to meet the purpose of each operation. In this way, it is possible to reduce time and effort to switch screens, and operability is improved. For example, by exclusively aggregating information related to a specific system, it becomes easy to confirm a processing status of the specific system. In addition, by displaying a program using a tool, tool correction value, tool management data, etc. as related information of a specific tool on one screen, a verification task before processing, such as verifying whether the tool is optimum for processing or whether the correction value is appropriate, is facilitated.

In addition, according to the present embodiment, the numerical controller 1 can easily create a custom screen on which information selected by the user is exclusively collected. In this way, a target desired to be confirmed by the user is exclusively aggregated on one screen, and visibility is improved. In addition, because of the reduction in the amount of data the numerical controller 1 aggregates, the load and usage of resources such as a CPU, a bus, and communication decrease.

Embodiment 2

A description will be given of a numerical controller 1 as Embodiment 2 in which user can create new attributes. A hardware configuration (FIG. 1) and a functional configuration (FIG. 2) of the numerical controller 1 according to Embodiment 2 are basically the same as those shown in Embodiment 1. Hereinafter, description of the same configuration and operation as those of Embodiment 1 will be omitted, and an operation specific to Embodiment 2 will be mainly described.

Figure 12:
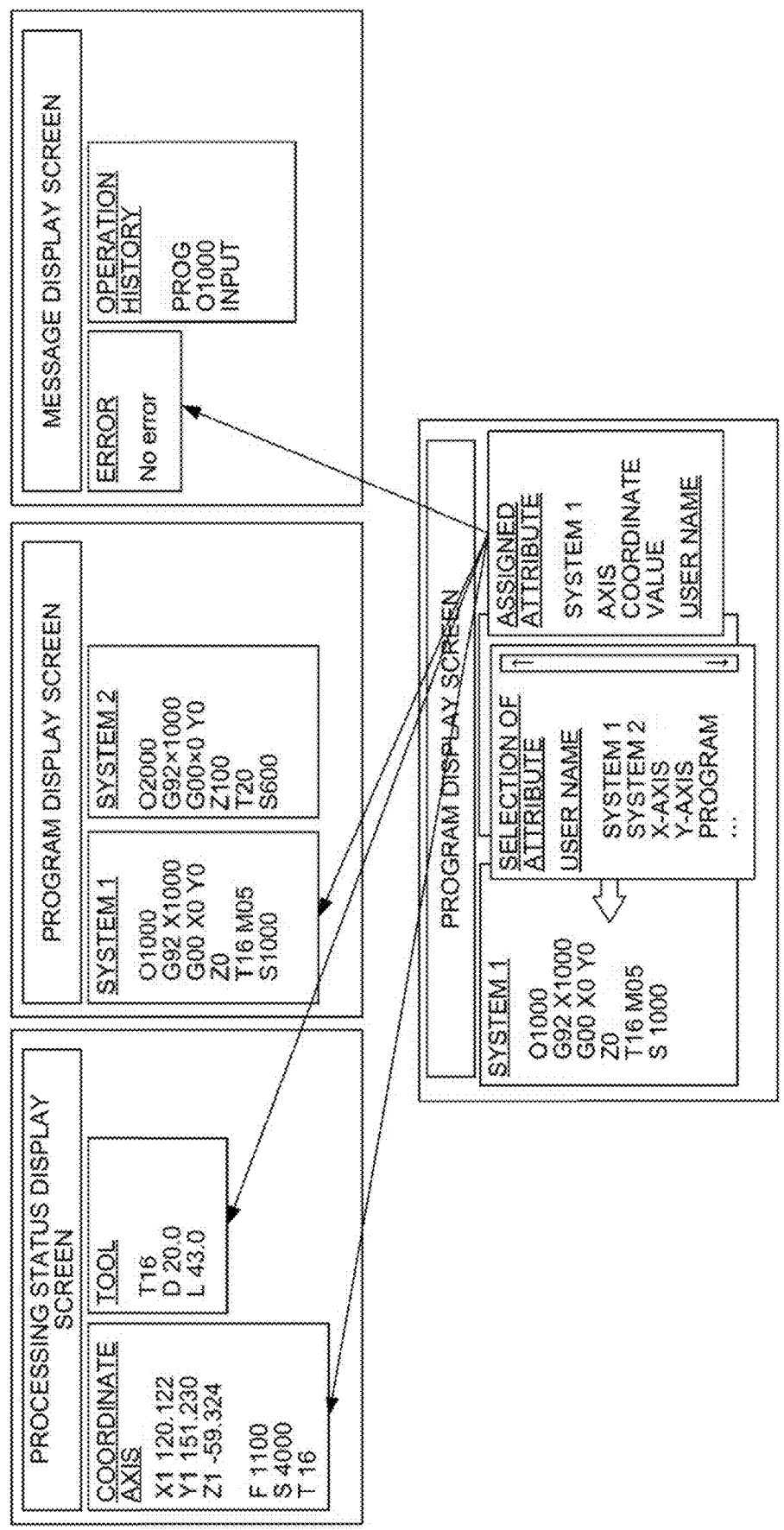
FIG. 12 is a diagram illustrating an operation of an attribute assignment unit of Embodiment 2.
Figure 13:
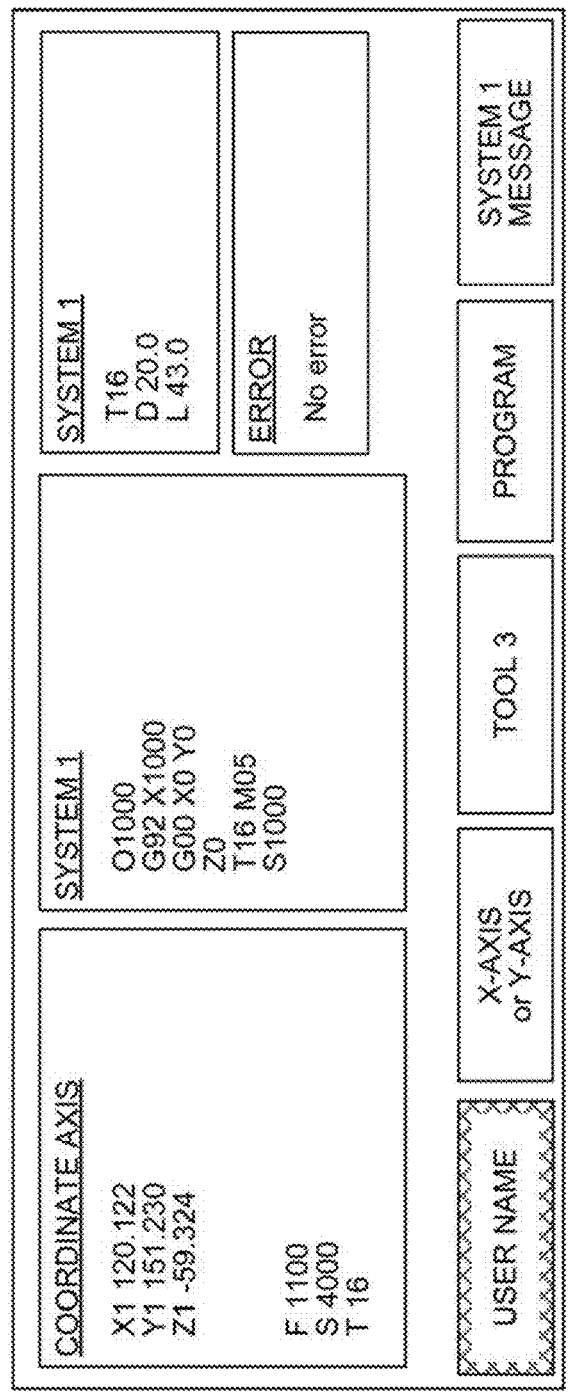
FIG. 13 is a diagram illustrating operations of the custom screen creation unit and a custom screen display unit of Embodiment 2.

A description will be given of an example of an operation of the numerical controller 1 according to Embodiment 2 with reference to FIG. 11 to FIG. 13. When a custom screen creation command is executed, a custom screen creation unit 102 displays a blank custom screen and a plurality of blank soft keys on a screen. Upon detecting a predetermined operation (for example, a right-click operation, a tap operation, etc.) performed on the blank soft key (the selected soft key is indicated by hatching in FIG. 11), the custom screen creation unit 102 displays an attribute list (a pop-up menu named "selection of attribute" in FIG. 11) for assigning an attribute. This attribute list includes one or more attributes assigned to a screen component.

Figure 11:
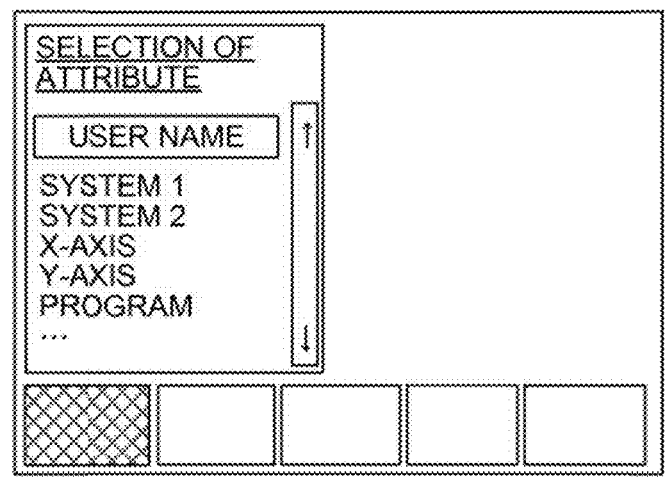
FIG. 11 is a diagram illustrating an operation of a custom screen creation unit of Embodiment 2.

The custom screen creation unit 102 of Embodiment 2 displays an input area in this attribute list (displayed at a top of the attribute list in FIG. 11). When the user inputs a name of a new attribute to the input area (a "user name" is input in FIG. 11), a new attribute is added to the attribute list (FIG.

10). The new attribute is typically an attribute effective on a per-user basis, but may be effective on any scope such as a group or all users.

Thereafter, an attribute assignment unit 101 can assign a new attribute to each element of an existing screen. Upon detecting a predetermined operation (for example, a right-click operation, a tap operation, etc.) performed on a screen component (a processing program display area of "system 1" in FIG. 12) of the existing screen (a "program display screen" in FIG. 12), the attribute assignment unit 101 displays an attribute list (a pop-up menu named "selection of attribute" in FIG. 12) for selecting an assigned attribute. A list of attributes that can be assigned to the screen component is displayed in the attribute list, which includes a new attribute "user name". When the user selects a desired attribute from the attribute list, the attribute assignment unit 101 assigns the selected attribute to the screen component. It is preferable to feed back the attribute assigned to the screen component to notify the user what attribute have been selected. In FIG. 12, one or more attributes currently assigned to the screen component are listed and displayed in a pop-up window ("assigned attribute"). By a similar operation thereto, the attribute assignment unit 101 can assign a new attribute "user name" to various components of various existing screens.

The custom screen creation unit 102 and the custom screen display unit 103 provide a function of aggregating and displaying screen components to which a new attribute is assigned. The example in FIG. 13 illustrates a state in which the new attribute "user name" is assigned to one of the soft keys. When the soft key "user name" is pressed, the custom screen creation unit 102 or the custom screen display unit 103 collects screen components to which the attribute "user name" is assigned, and displays the collected screen components on a blank custom screen. That is, screen components having the attribute "user name", which originally exists in a dispersed manner in various existing screens, are laterally collected and displayed on one custom screen in an aggregated manner.

According to the present embodiment, the numerical controller 1 can easily create a new attribute and assign the created attribute to the screen component. In this way, the user can set an arbitrary attribute on the screen component. Thus, for example, a custom screen specific to each user can be easily created.

The embodiments described above may be modified as appropriate as long as a subject manner of the application is not impaired. For example, even though Embodiment 2 shows an example in which the custom screen creation unit 102 additionally registers a new attribute, the application is not limited thereto. The new attribute may be registered using another arbitrary method. For example, the attribute assignment unit 101 may provide an input area in an attribute list (a pop-up menu named "selection of attribute" in FIG. 12) so that a new attribute name can be input.

In addition, even though the above-described embodiments disclose a scheme of assigning logical operation results of a plurality of attributes to one soft key, the application is not limited thereto, and the logical operation results of the plurality of attributes may be displayed using another arbitrary method. For example, the numerical controller 1 may allow soft keys, to which attributes have been previously assigned, to be simultaneously selected, and display logical operation results (AND, OR, NOT, etc.) of the attributes assigned to the selected soft keys in a custom screen.

Even though the embodiments of the application have been described above, the application is not limited to examples of the embodiments and can be implemented in another aspect by adding appropriate changes.

The invention claimed is:

1. A numerical controller for controlling a machine tool comprising:
   a processor configured to:
      assign at least one attribute selected by a user to a plurality of screen components selected by the user, the plurality of screen components being included in one or more existing screens;
      display a custom screen such that the plurality of screen components to which a common attribute in the at least one attribute is assigned are aggregated and displayed; and
      control the machine tool to perform machining and allow the user to confirm a machining status with the custom screen.

2. The numerical controller according to claim 1, wherein the processor is further configured to set a plurality of attributes to be displayed on the custom screen and a logical relationship between the plurality of attributes.

3. The numerical controller according to claim 1, wherein the at least one attribute selected by the user is allowed to be newly registered.

* * * * *